United States Patent [19]

Rigler et al.

[11] 3,853,722

[45] Dec. 10, 1974

[54] METHOD OF PRODUCING PRILLED SODIUM HYDROXIDE FROM MERCURY CELL SODIUM HYDROXIDE

[75] Inventors: Donald T. Rigler; Knut J. Johnsen, both of Lake Charles, La.

[73] Assignee: PPG Industries, Inc., Pittsburgh, Pa.

[22] Filed: June 28, 1973

[21] Appl. No.: 374,432

[52] U.S. Cl. ................................ 204/99, 204/128
[51] Int. Cl. ...................... C01d 1/08, C01d 1/28
[58] Field of Search ............................ 204/99, 128

[56] References Cited
FOREIGN PATENTS OR APPLICATIONS
1,058,581  2/1967  Great Britain ...................... 204/99

Primary Examiner—R. L. Andrews
Attorney, Agent, or Firm—Richard M. Goldman

[57] ABSTRACT

Disclosed is a method of producing fused caustic soda prills from mercury cell caustic soda. Mercury cell caustic soda generally contains more than about 0.10 parts per million of mercury on an anhydrous basis and less than 0.005 weight percent of sodium chloride on an anhydrous basis. According to the disclosed process, sufficient mercury is removed from the mercury cell caustic soda to provide a mercury content of less than 0.10 parts per million of mercury, anhydrous basis, and sufficient sodium chloride is added to the caustic soda to provide a sodium chloride content of greater than 0.05 weight percent, anhydrous basis.

11 Claims, 1 Drawing Figure

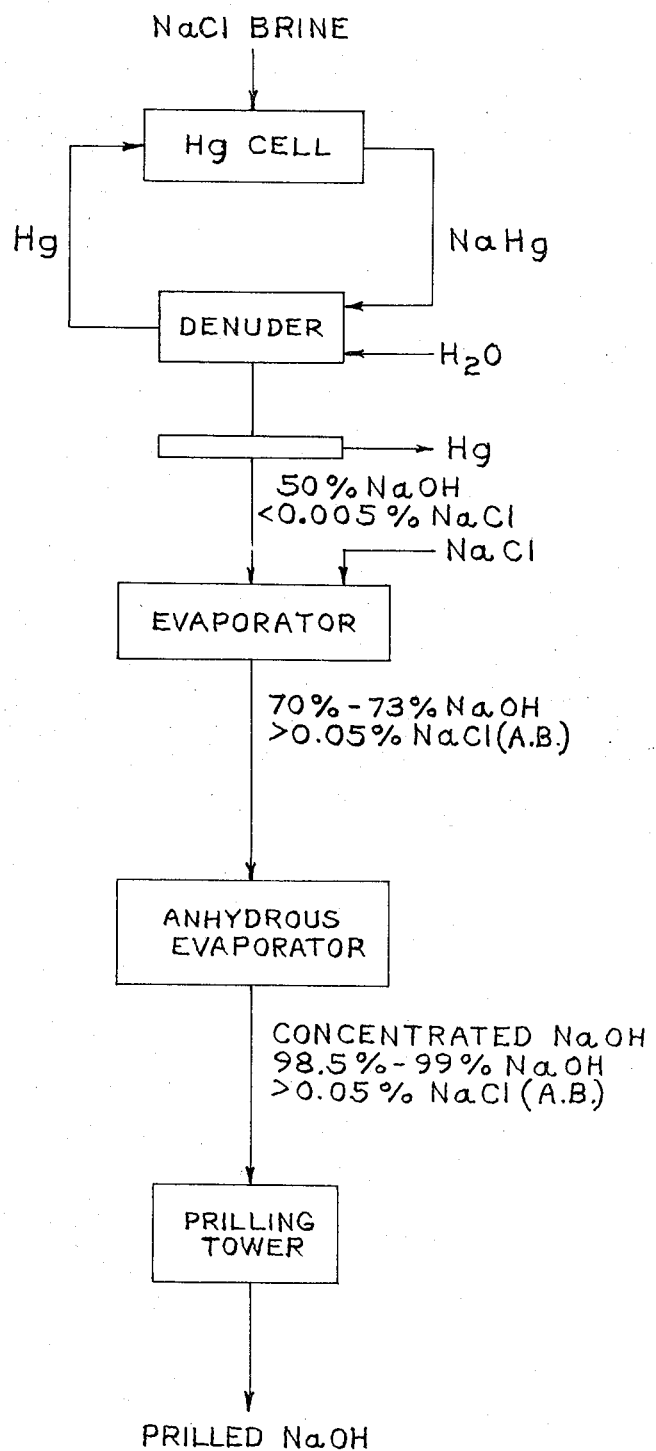

3,853,722

METHOD OF PRODUCING PRILLED SODIUM HYDROXIDE FROM MERCURY CELL SODIUM HYDROXIDE

BACKGROUND OF THE INVENTION

One form of commercial caustic soda is prilled caustic soda. Caustic soda prills are spheres of anhydrous caustic soda, generally 0.5 to about 3.0 millimeters in diameter, and most commonly from about 0.6 to about 2 millimeters in diameter. Prilled anhydrous caustic soda contains less than 2 weight percent water, generally less than 0.5 percent water, and preferably less than 0.1 weight percent water. Prilled caustic soda typically has a density of from 65 to 80 pounds per cubic foot and preferably from about 68 to 75 pounds per cubic foot.

The preferred prilled caustic soda of commerce is white in color with off-color prills, e.g., gray, blue, and purple prills, being commercially unacceptable.

Prilled caustic soda has been produced from diaphragm cell caustic soda with the prilled caustic soda being the final product in the diaphragm cell process. Diaphragm cell caustic is initially recovered from the diaphragm cell in the form of aqueous cell liquor containing from about 100 to 140 grams per liter of caustic soda, and from about 160 to 195 grams per liter of sodium chloride. The cell liquor is passed to a three-stage evaporator. In the evaporator substantially all of the sodium chloride is crystallized out and an approximately 50 weight percent aqueous solution of hydroxide is recovered from the third stage. The 50 weight percent solution of aqueous caustic soda is then further evaporated at a reduced pressure, e.g., from about 0.07 to about 0.15 atmospheres. The reduced pressure evaporation is commonly referred to as a fourth-stage evaporation, and the evaporator used in carrying it out is commonly referred to as a fourth-stage evaporator. The product from the fourth-stage evaporator is a 70–75 weight percent aqueous solution of caustic soda, generally 73 weight percent caustic soda. The 73 weight percent caustic soda is concentrated to form anhydrous caustic soda. This is generally carried out in an anhydrous evaporator. A product containing from about 98.5 to about 99 percent of caustic soda is recovered from the anhydrous evaporator. The 98.5 to 99 weight percent caustic soda is then prilled.

Various methods of prilling caustic soda are known in the art. For example, according to U.S. Pat. No. 3,704,102 to Allen, molten anhydrous caustic soda is dropped into rotating prilling cups and allowed to fall downward against a counter current upward flow of hot air. The resulting products are spheres of prilled caustic soda.

According to U.S. Pat. No. 3,607,994 to Krause and Willson, molten anhydrous caustic soda is fed upward with a co-current flow of heated air thereby forming prilled caustic soda.

According to U.S. Pat. No. 2,635,184 to Joscelyne, molten anhydrous caustic soda is fed upward and subjected to a cross current flow of heated air whereby prilled caustic soda is formed and recovered.

According to U.S. Pat. No. 2,556,185 to Joscelyne, molten anhydrous caustic soda is permitted to fall from the top of a heated prilling tower. The heated air in the prilling tower causes caustic soda prills to form.

SUMMARY OF THE INVENTION

Mercury cell caustic soda has generally provided an unsatisfactory source of prilled caustic soda. Prilled mercury cell caustic soda is off-white, and generally gray to blue or purple in color, and therefore an unsatisfactory item of commerce. Attempts to remedy the discoloration of prilled mercury cell caustic soda have generally encompassed adding various additives to the 98+ percent concentrated anhydrous caustic soda in the prilling tower or to the 73 percent anhydrous caustic soda fed to the anhydrous evaporator. Such additives have included bisulfite ion, as sodium bisulfite, and sugar. All such attempts have proved unsatisfactory in that either the discoloration still remains or the prilling tower itself develops a rapid sludge build-up blocking the flow of concentrated caustic soda.

It has now surprisingly been found that the discoloration is substantially avoided if the sodium chloride content in the caustic is maintained at from about 0.05 to about 0.15 weight percent sodium chloride, basis anhydrous caustic soda, and the mercury content is maintained at less than 0.10 parts per million mercury, basis anhydrous caustic soda, during the evaporation and prilling steps.

DESCRIPTION OF THE INVENTION

A white, prilled anhydrous caustic soda is prepared from mercury cell caustic soda by maintaining a sodium chloride content in the caustic soda of from about 0.05 to about 0.15 weight percent sodium chloride, anhydrous basis and maintaining the mercury content in the caustic soda at less than 0.10 parts per million, anhydrous basis, during evaporation and prilling.

The method of this invention may be more clearly understood by reference to the FIGURE. A flow chart of the preferred exemplification of preparing prilled caustic soda according to this invention is shown in the FIGURE. As shown in the flow chart, sodium chloride brine is fed to a mercury cathode electrolytic cell. Mercury-sodium amalgam is recovered from the mercury cell and fed to a denuder, or secondary cell. In the denuder or secondary cell, the amalgam is contacted with water. Aqueous sodium hydroxide is formed and mercury is recovered for recycling to the mercury cell. The mercury still remaining in the caustic soda may be removed, or the concentration thereof reduced, e.g., by electrolysis or filtration.

The aqueous sodium hydroxide is recovered from the denuder and filtration or electrolysis units, if any, and thereafter fortified with sodium chloride to maintain a sodium chloride content of from about 0.05 to about 0.15 weight percent sodium chloride anhydrous basis in the caustic.

The sodium chloride fortified caustic soda, reduced in mercury content, is fed to an evaporator system and concentrated anhydrous sodium hydroxide is recovered from the evaporator system. As shown in the flow chart, the evaporator system may be either a single evaporator or a two-stage evaporator, i.e., a 73 percent evaporator and an anhydrous evaporator.

The concentrated sodium hydroxide is recovered from the evaporators and fed to a prilling tower where a white prilled anhydrous sodium hydroxide is produced.

According to this invention, the source of caustic soda is an electrolytic cell having a flowing mercury amalgam cathode. Such cells are well-known in the art and are described, for example, in the article by R. B. MacMullin, "Electrolysis of Brines in Mercury Cells" appearing in Sconce, ed. *Chlorine, Its Manufacture, Properties, and Uses*, Monograph No. 154, American Chemical Society Monograph Series, Reinhold Publishing Corporation, New York, New York, (1962), pp 127–199, and in C. L. Mantell, Electrochemical Engineering, McGraw-Hill Publishing Co., New York, New York (1960), pp 257–278.

In the mercury cell process saturated, dechlorinated brine is fed to an electrolytic cell having a flowing mercury amalgam cathode. The saturated brine typically contains from about 300 to about 325 grams per liter of sodium chloride and has a pH of about 4.0.

The flowing mercury amalgam cathode typically contains less than 0.01 weight percent sodium when fed to an individual electrolytic cell. In operation of the cell, current flows from an external source to the anodes and from the anodes through the electrolyte to the cathodes. The anodic reaction is:

$$2Cl^- \rightarrow 2Cl^0 + 2e^- \rightarrow Cl_2$$

The cathodic reaction is:

$$Na^+ + (Hg) + e^- \rightarrow Na(Hg)$$

The evolved chlorine is recovered substantially along the entire length of the cell. At the outlet of the cell depleted brine containing about approximately 250–270 grams per liter of sodium chloride, and mercury-sodium amalgam containing approximately 0.30 to 0.50 weight percent sodium are recovered.

The mercury-sodium amalgam recovered from the mercury cell is fed to a denuder where it is contacted with water and aqueous sodium hydroxide is recovered. As used herein a denuder includes what is also known as a decomposer or a secondary cell. In the denuder, the mercury amalgam is the anode and the following reaction occurs at the mercury:

$$Na(Hg) \rightarrow Na^+ + e^-$$

Graphite packing in the denuder is the cathode of the denuder. The cathodic reaction is:

$$H_2O + e^- \rightarrow OH^- + \tfrac{1}{2}H_2$$

The electrolyte in the denuder is aqueous sodium hydroxide and the graphite cathodes are in contact with the electrolyte and the amalgam. This causes internal shorting of the secondary cell or denuder.

The caustic soda recovered from the denuder may be 50 percent caustic soda. Fifty percent caustic soda is recovered if the denuder is operated at a temperature of 80°C. Alternatively, the caustic soda recovered may be 73 weight percent caustic soda. Seventy three percent caustic soda may be recovered by operating the denuder at 110°C. and providing heat, e.g., steam heat, to the denuder. In this way the denuder serves as an evaporator.

The concentration of sodium hydroxide in the solution recovered from the denuder or secondary cell depends primarily on equilibria and economic considerations. However, caustic soda as dilute as 10 50 weight percent caustic or as concentrated as 73 weight percent caustic may be recovered from the denuder. As a practical matter, the caustic soda solution recovered from the denuder contains at least 20 percent caustic soda and generally from about 44 to about 73 percent caustic soda, and most frequently 50 to 51 weight percent caustic soda.

The caustic soda solution recovered from the denuder typically contains from about 0.1 to about 0.25 parts per million mercury on an anhydrous caustic soda basis and most frequently from about 0.10 to about 0.15 parts per million mercury on an anhydrous basis. The solution also generally contains less than about 0.50 parts per million (0.005 weight percent) sodium chloride on an anhydrous basis.

According to this invention, the effluent from the denuder is then subjected to a process to reduce the mercury content to less than about 0.10 parts per million of mercury and preferably less than 0.05 parts per per million of mercury. This may be accomplished by electrolyzing the aqueous hydroxide solution. According to one process, the electrolysis may be carried in an electrolytic cell having a porous cathode. According to another process, the mercury may be removed from the caustic soda by filtration. Alternatively, various chemical steps may be used such as chelation or precipitation of the mercury.

According to one exemplification of this invention, the aqueous sodium hydroxide is then fortified with sodium chloride. Sufficient sodium chloride is added to provide a sodium chloride content of from 0.05 to about 0.15 weight percent sodium chloride, based on anhydrous sodium hydroxide, i.e., anhydrous basis. Lesser amounts of sodium chloride, e.g., less than 0.05 weight percent sodium chloride, anhydrous basis, do not appear to provide a satisfactory prilled caustic soda product. Sodium chloride contents of greater than about 0.15 weight percent sodium chloride, anhydrous basis are not generally required, as 0.15 weight percent sodium chloride appears sufficient to prevent discoloration in most cases. However, sodium chloride contents as high as the solubility limit of sodium chloride in caustic soda under conditions present in the 73 percent evaporator or the anhydrous evaporator may be present.

The sodium chloride may be added in the form of diaphragm cell liquor. Normally from about 10 to about 20 grams of diaphragm cell liquor are required per 500 grams of anhydrous sodium hydroxide, i.e., per 1,000 grams of 50 weight percent sodium hydroxide.

Alternatively, a saturated brine solution may be added to the sodium hydroxide. Typically, from about 4 to about 10 grams of saturated brine are needed per 500 grams of anhydrous basis sodium hydroxide, i.e., per 1,000 grams of 50 weight percent sodium hydroxide.

While spoken of and illustrated with reference to the addition of sodium chloride to a 50 weight percent sodium hydroxide, it is understood that sodium chloride either in the form of brine or in the form of cell liquor may be added to a 73 weight percent caustic soda solution such as would be obtained from a steam-jacketed denuder, or as would be obtained from a sub-atmospheric pressure evaporator. Alternatively the sodium chloride may be added to substantially anhydrous sodium hydroxide, e.g., the sodium hydroxide obtained from an anhydrous evaporator or fed to a prilling tower.

In a preferred exemplification of this invention, the sodium chloride fortified caustic soda is then fed to an evaporating means and concentrated sodium hydroxide is recovered therefrom. This may be accomplished according to a two-step process known in the art where the aqueous caustic soda is fed to a sub-atmospheric pressure evaporator, e.g., the "fourth evaporator," and then to an anhydrous evaporator. In the sub-atmospheric evaporator the feed is 50 weight percent sodium hydroxide and the product is 73 weight percent sodium hydroxide. The evaporator operates at a reduced pressure, such as a vacuum of 26 to 27 inches of mercury, i.e., an absolute pressure of 3 or 4 inches of mercury. In a vacuum evaporator forced circulation of the sodium hydroxide is obtained by methods well known in the art, and steam at 60 pounds per square inch absolute pressure is the heating medium. The heating medium may either flow through pipes in the walls of the evaporator or through a heat exchanger tube bundle in the caustic soda. Seventy-three percent caustic is the product normally recovered from the vacuum evaporator.

The 73 weight percent caustic is fed to an anhydrous evaporator. Typically, the anhydrous evaporator is a nickel-lined vessel operating at sub-atmospheric pressure, e.g., 10 to 15 inches of mercury and most commonly about 12 to 13 inches of mercury. The anhydrous evaporator is typically heated with a high temperature heat transfer medium such as Dowtherm (TM), a liquid composition containing 73.5 weight percent diphenyloxide and 26.5 weight percent diphenyl. In this way, a caustic temperature within the anhydrous evaporator of about 350°C. or higher is attained.

In the anhydrous evaporator the heat transfer medium, e.g., Dowtherm (TM), is fed to the tube bundle of a shell and tube heat exchanger-type boiler. In one form of anhydrous evaporator, the heat transfer medium is heated to a vapor and condenses inside the tubes, providing both a sensible heat effect and a latent heat effect.

In another form of anhydrous evaporator, the heat-exchange tubes carry a liquid heat-exchange medium, e.g., Dowtherm (TM). In this form of anhydrous evaporator, the heating effect arises from the sensible heat of the heat-exchange medium.

Alternatively, single stage evaporation methods may be used, for example 50 weight percent sodium hydroxide may be heated in a nickle-lined steel pot by electrical resistance, coal, oil, or gas to yield 98+ weight percent anhydrous caustic soda, or 50 weight percent caustic soda may be heated in a steam-jacketed nickle-lined vessel whereby to obtain 98+ weight percent anhydrous caustic soda.

The concentrated caustic soda is then prilled. One method of prilling is described in U.S. Pat. No. 3,704,102 to Allen, the entire disclosure of which is herein incorporated by reference. In Allen, 98.5 weight percent to 99 weight percent anhydrous caustic soda is maintained molten and preferably at a temperature of from about 325°C. to about 350°C. The molten caustic soda is fed from the top of the prilling tower into rotating prilling cups, drops through holes in the rotating prilling cups, and falls the entire length of the prilling tower, counter-current to an upward flow of heated air. The air which is fed in at the bottom of the prilling tower at a temperature of about 122°C., contacts the falling caustic soda, and exits at a temperature of from about 170°C. to about 230°C. The prilled caustic soda is collected at the bottom of the prilling tower at a temperature above about 122°C. and below 260°C.

According to another exemplification of this invention, caustic soda prills may be prepared as disclosed in U.S. Pat. No. 2,556,185 to Joscelyne. In Joscelyne, molten 85+ percent sodium hydroxide is introduced into the top of a prilling tower through spray-drying nozzles. The temperature within the prilling tower is maintained above 200°C. and the pressure is maintained at sub-atmospheric pressure, e.g., from about 100 to about 400 millimeters of mercury. The molten caustic soda is permitted to fall from the spray drying nozzles and a prilled caustic soda product is obtained.

According to U.S. Pat. No. 2,635,684, the molten caustic soda containing in excess of 80 weight percent sodium hydroxide is sprayed upward from the bottom of the prilling tower. Heated air is caused to flow perpendicular to the molten caustic, providing prilled caustic soda.

According to U.S. Pat. No. 3,607,994 to Krause and Willson, an upward flow of molten caustic soda flows co-current with heated air thereby providing a prilled caustic soda.

While the invention has been described with reference to the addition of sodium chloride to the mercury cell caustic, other methods of obtaining a sodium chloride content of from about 0.05 to about 0.15 weight percent sodium chloride, anhydrous basis, in the sodium hydroxide may be used with entirely satisfactory results. For example, chlorine ion in the form of hydrochloric acid, or in the form of salts such as calcium chloride or potassium chloride or the like may be added to the caustic soda. Alternatively, chlorine gas may be bubbled into and through the caustic soda, thereby to provide chlorine which may react with the sodium hydroxide to form the sodium chloride.

The following example is illustrative of this invention.

EXAMPLE

Three extended runs were made to test the effects of mercury content and sodium chloride content in mercury cell caustic soda used in the manufacture of prilled caustic soda. In all three tests, anhydrous caustic soda containing 50.4 weight percent sodium hydroxide was fed to a vacuum evaporator producing 73 weight percent sodium hydroxide. The 73 weight percent was then fed to an anhydrous evaporator producing 98.5 weight percent sodium hydroxide, i.e., concentrated caustic soda. The concentrated caustic soda was heated to a temperature of 330°C. and fed at the rate of 8,350 pounds per hour to a prilling cup located in the upper portion of a prilling tower 20 feet in diameter and having an effective falling height, i.e., distance from the top of the prilling cup to the top of the air inlet, of approximately 65½ feet. Atmospheric air, preheated to 130°C., was fed to the prilling tower about 2 feet above the floor of the prilling tower at the rate of 19,200 actual cubic feet per minute. The air exited from the upper portion of the tower at a temperature of approximately 184°C.

Caustic soda prills from about 1.0 to about 1.5 millimeters in diameter and at a temperature of approximately 208°C. were collected on the floor of the tower. The caustic soda prills were promptly recovered from the tower and cooled to below 60°C. in an anhydrous atmosphere.

Run A

Over an eight-month period, caustic soda containing 0.04 to 0.08 parts per million of mercury, basis anhydrous sodium hydroxide, and 0.004 to 0.048 weight percent sodium chloride, basis anhydrous sodium hydroxide, was recovered from the denuder and fed to a 73 weight percent evaporator. The resulting 73 percent caustic was then fed to an anhydrous evaporator, and then to a prilling tower. During the test, the prilled caustic soda exhibited a blue discoloration.

Run B

During an eight-month test period, the effluent from the denuder contained from about 0.16 to about 1.41 parts per million of mercury, basis anhydrous caustic soda, and from about 0.05 to about 0.13 weight percent sodium chloride, basis anhydrous caustic soda. This caustic soda was evaporated to 73 weight percent caustic soda, concentrated to anhydrous caustic soda, and prilled. Throughout the period of the test, the prilled caustic soda exhibited a blue discoloration.

Run C

During a four-month test period, the mercury content in the effluent from the denuder was maintained at from about 0.01 to about 0.10 parts per million of mercury, basis anhydrous caustic soda. The caustic soda was fortified with diaphragm cell liquor to provide a caustic soda solution containing from about 0.07 to about 0.12 weight percent sodium chloride, basis anhydrous caustic soda. The caustic soda was then evaporated to 73 weight percent caustic soda, concentrated to anhydrous caustic soda and prilled. Throughout the four-month period of the test, white prills showing substantially no discoloration were obtained.

While this invention has been described with respect to prilled anhydrous caustic soda, it may also be used in preparing white, solid, anhydrous caustic soda from mercury cell caustic soda. For example, the method of this invention may be used to prepare caustic soda flakes.

It is to be understood that although the invention has been described with reference to specific details of particular embodiments thereof, it is not to be so limited since changes and alterations therein may be made which are within the full intended scope of this invention as defined by the appended claims.

We claim:

1. A method of producing caustic soda prills from mercury cell aqueous caustic soda which contains mercury and less than 0.005 weight percent, anhydrous basis, of sodium chloride, comprising:
    maintaining the mercury content of the aqueous caustic soda below about 0.10 parts per million, anhydrous basis;
    adding sufficient sodium chloride to said aqueous caustic soda to provide a sodium chloride content greater than 0.05 weight percent, anhydrous basis;

thereafter forming substantially anhydrous caustic soda; and
    prilling the substantially anhydrous caustic soda, whereby to form prills.

2. The method of claim 1 wherein said aqueous caustic soda is prepared by feeding brine to an electrolytic cell having a flowing mercury amalgam cathode and recovering mercury-sodium amalgam.

3. The method of claim 2 comprising feeding the mercury-sodium amalgam to a denuder, and recovering aqueous caustic soda.

4. The method of claim 1 comprising electrolytically removing the mercury from said aqueous caustic soda.

5. The method of claim 1 wherein the sodium chloride is added to the aqueous caustic soda in the form of brine.

6. The method of claim 1 wherein the sodium chloride is added to the aqueous caustic soda in the form of diaphragm cell catholyte liquor.

7. A method of producing sodium hydroxide prills comprising:
    feeding brine to an electrolytic cell having a flowing mercury amalgam cathode;
    electrolyzing the brine in said cell;
    recovering mercury-sodium amalgam from said cell;
    feeding the mercury-sodium amalgam to a denuder;
    contacting the mercury-sodium amalgam with water thereby forming aqueous sodium hydroxide having a sodium chloride content of less than 0.005 weight percent, anhydrous basis;
    recovering the aqueous sodium hydroxide from said denuder;
    removing mercury from said aqueous sodium hydroxide thereby providing a mercury content of less than 0.1 parts per million, anhydrous basis, in the sodium hydroxide;
    adding sodium chloride to the aqueous sodium hydroxide to provide a sodium chloride content of greater than 0.05 weight percent, anhydrous basis, in the sodium hydroxide;
    feeding the aqueous sodium hydroxide to an evaporator, evaporating the water from the sodium hydroxide and recovering substantially anhydrous sodium hydroxide from the evaporator; and;
    feeding the substantially anhydrous sodium hydroxide to a prilling tower, prilling the sodium hydroxide, and recovering sodium hydroxide prills.

8. The method of claim 7 wherein the aqueous sodium hydroxide recovered from the denuder contains more than 0.10 parts per million mercury, anhydrous basis.

9. The method of claim 7 comprising electrolytically removing the mercury from the aqueous sodium hydroxide.

10. The method of claim 7 wherein the sodium chloride is added to the aqueous sodium hydroxide in the form of brine.

11. The method of claim 7 wherein the sodium chloride is added to the aqueous sodium hydroxide in the form of diaphragm cell catholyte liquor.

* * * * *